Dec. 19, 1961        H. T. SZOSTAK        3,013,809
MOTOR VEHICLE AIR SUSPENSION LEVELING SYSTEM
Filed Oct. 31, 1957        2 Sheets-Sheet 1

H. T. SZOSTAK
INVENTOR.

BY E. C. McRae
J. R. Faulkner
D. H. Oster

ATTORNEYS

Dec. 19, 1961   H. T. SZOSTAK   3,013,809
MOTOR VEHICLE AIR SUSPENSION LEVELING SYSTEM
Filed Oct. 31, 1957   2 Sheets-Sheet 2

H. T. SZOSTAK
INVENTOR.

BY E. C. McRae
J. R. Faulkner
D. H. Oster

ATTORNEYS

United States Patent Office 3,013,809
Patented Dec. 19, 1961

3,013,809
MOTOR VEHICLE AIR SUSPENSION LEVELING SYSTEM
Henry T. Szostak, Dearborn, Mich., assignor to Ford Motor Company, Dearborn, Mich., a corporation of Delaware
Filed Oct. 31, 1957, Ser. No. 693,716
6 Claims. (Cl. 280—112)

This invention relates generally to an air suspension system for a motor vehicle, and particularly to the leveling mechanism for the system.

An object of the invention is to provide an air suspension system for a motor vehicle incorporating leveling mechanism automatically maintaining a predetermined relationship between the vehicle chassis and the road wheels regardless of the load on the vehicle, yet which will eliminate or reduce undesired filling or exhausting of the air springs during acceleration, deceleration and cornering of the vehicle, and also when the vehicle is on an inclined or crowned road.

In many air suspension systems the leveling mechanism is operative during vehicle operation. Such systems often incorporate time-delay leveling valves to eliminate or reduce undesired leveling operations resulting from road irregularities and the like. Even with a time-delay feature, however, such systems will eventually effect a height correction during acceleration and deceleration of the vehicle, and on curves, hills and crowned roads. It is, therefore, an object of the present invention to provide means opposing or counteracting such undesired leveling corrections.

In an embodiment of the invention, an inertia responsive member which may, for example, be a movable mounted weight, is provided in conjunction with each leveling valve, and is so mounted as to oppose the undesired leveling valve actuation. In the specific embodiment illustrated, the inertia responsive member for the front leveling valve is mounted for movement longitudinally of the vehicle to function during acceleration and deceleration of the vehicle, and also when the vehicle is on a hill. The inertia responsive member for the rear leveling valve is mounted for movement transversely of the vehicle to operate during cornering of the vehicle and when the vehicle is on crowned roads. Many other embodiments or arrangements of the present invention are possible, of course.

Other objects and advantages of this invention will become more apparent as the description proceeds, particularly when considered in connection with the accompanying drawings in which.

Figure 1:
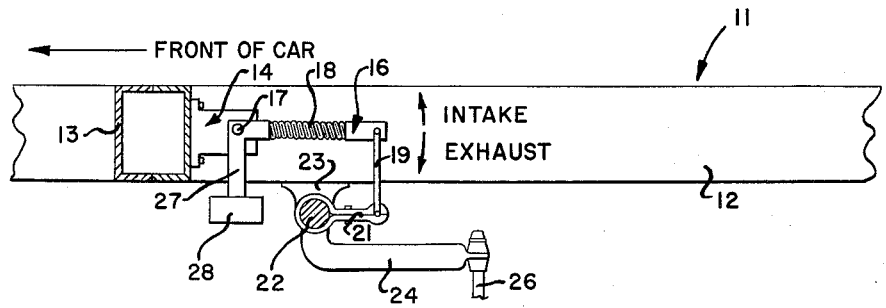
FIGURE 1 is a fragmentary semi-diagrammatic side elevational view of the forward portion of a motor vehicle chassis incorporating the present invention.
Figure 2:
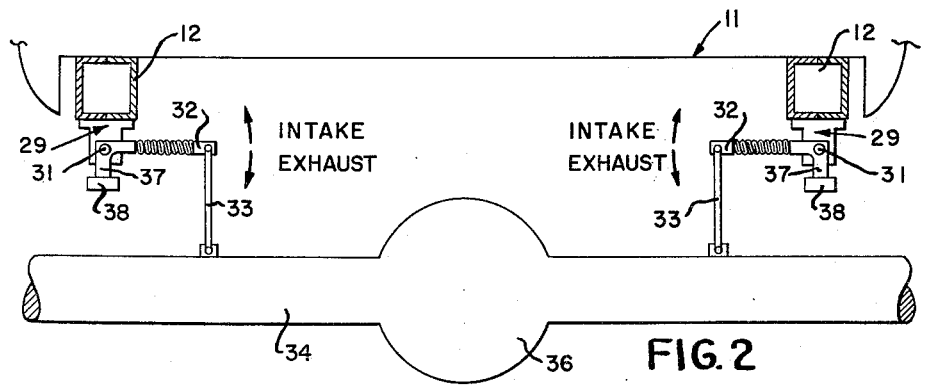
FIGURE 2 is a semi-diagrammatic rear elevational view of the rearward portion of the motor vehicle chassis shown in FIGURE 1.
Figure 5:
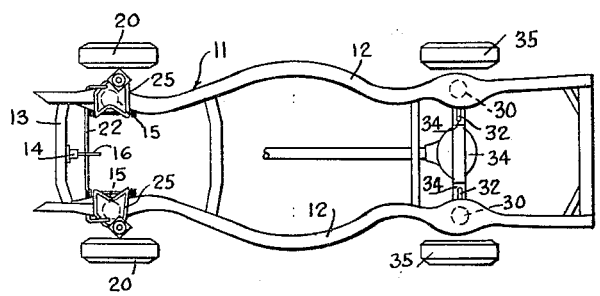
FIGURE 5 is a diagrammatic plan view of a vehicle chassis incorporating the present invention.

Referring now to the drawings and particularly to FIGURES 1 and 2, the reference character 11 indicates a motor vehicle chassis having longitudinally extending side frame rails 12, and a transversely extending front cross frame member 13.

With particular reference to FIGURE 1, a single front leveling valve 14 controls the flow of air to and from the air springs 15 for the front road wheels 20, and is mounted generally centrally of the vehicle on the rearward side of the front cross frame member 13. An actuating arm 16 is mounted upon the actuating shaft 17 of the leveling valve, and incorporates a coil spring 18 to provide flexibility. The outer end of the arm 16 is connected by means of a link 19 to an arm 21 secured to the stabilizer bar 22. The stabilizer bar 22 is conventionally mounted upon the vehicle frame for pivotal movement by means of brackets 23, and has crank arms 24 at opposite ends connected by links 26 to the suspension arms 25 at opposite sides of the vehicle. The arrangement is such that relative movement between the front road wheels and the vehicle chassis results in rotation of the stabilizer bar 22, and through the arm 21, link 19 and flexible actuating arm 16, causes rotation of the valve actuating shaft 17.

It will be seen that downward movement of the forward portion of the vehicle chassis results in counterclockwise movement of the flexible actuating arm 16, which in turn tends to rotate the valve actuating shaft 17 in a counterclockwise direction to open the intake valve of the front leveling valve 14. Upward movement of the front of the chassis results in clockwise rotation of the actuating arm 16 to rotate the valve actuating shaft 17 in a clockwise direction to open the exhaust valve. As shown, the flexible actuating arm 16 is in the form of a bell crank lever having a downwardly depending arm 27 carrying at its lower end a counterweight 28 for a purpose to be discussed more in detail later.

Referring now to FIGURE 2, it will be seen that a pair of rear leveling valve 29 are provided, one adjacent each side of the vehicle chassis. The leveling valves are mounted upon the side frame rails 12 of the chassis, and the valve actuating shafts 31 are connected by means of flexible actuating arms 32 and links 33 to the rear axle 34 at opposite sides of the differential housing 36 thereof. The rear leveling valves 29 control the flow of air to and from the air springs 30 for the rear road wheels 35.

Each flexible actuating arm 32 is in the form of a bell crank having a downwardly depending arm 37 carrying at its lower end a counterweight 38. It will be noted that the rear leveling valves 29 are oppositely arranged, and that their actuating arms 32 extend inwardly toward each other from their points of connection with the valve actuating shafts 31. The arrangement is such that downward movement of either side of the vehicle chassis results in rotation of the actuating arm 32 and the valve actuating shaft 31 in a direction to open the intake valve of the particular rear leveling valve 29, while upward movement of the chassis results in rotation of the actuating arm 32 and the actuating shaft 31 of the leveling valve to open the exhaust valve of the particular unit.

Figure 3:
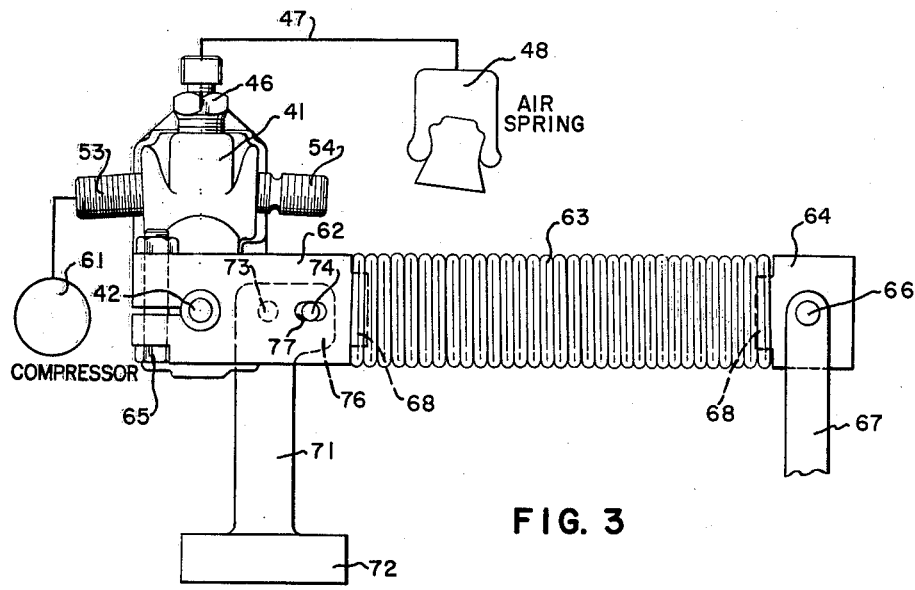
FIGURE 3 is an enlarged elevational view of a leveling valve incorporating the present invention.
Figure 4:
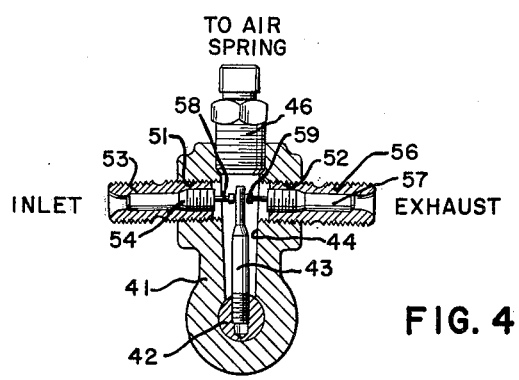
FIGURE 4 is a cross sectional view of valve mechanism shown in elevation in FIGURE 3.

FIGURES 3 and 4 illustrate in more detail a leveling valve which may be used in connection with the construction shown in FIGURES 1 and 2. The leveling valve comprises a housing 41 rotatably supporting a valve actuating shaft 42. An internal arm 43 is secured to the actuating shaft 42, and is adapted to oscillate within a chamber 44 which is connected by means of a fitting 46 and a conduit 47 to a conventional air spring 48. In the case of the rear leveling valves 29, each valve is connected to a single air spring, while in the case of the front leveling valve 14, the valve is connected to a pair of air springs, one adjacent each front road wheel.

Threaded passages 51 and 52 intercept the central air chamber 44 of the leveling valve, and respectively receive an inlet fitting 53 containing an inlet air valve 54, and an exhaust fitting 56 containing an exhaust air valve 57. The valves are conventional in construction, and have valve stems 58 and 59 arranged to be engaged by the internal arm 43 secured to the valve actuating shaft 42. It will be apparent that rotation of the valve actuating arm shaft 42 and its arm 43 in a counterclockwise direction engages the stem 58 of the inlet valve 54 to open the inlet valve and connect the air spring 48 to the air compressor 61. Clockwise rotation of the valve actuating shaft 42 causes the arm 43 to engage the stem 59 of the exhaust valve 57 to connect the air spring 48 to the atmosphere to permit the air within the air spring to be exhausted.

As seen in FIGURE 3, the valve actuating shaft 42 is secured to a flexible actuating arm comprising an inner section 62, a coil spring 63 and an outer section 64. The inner section 62 of the flexible arm is clamped to the actuating shaft 42 by means of a bolt 65 while the outer section 64 of the arm is pivotally connected at 66 to a downwardly depending link 67 suitably connected to a portion of the unsprung weight of the vehicle, as for example, the stabilizer bar 22 of FIGURE 1. The actuating arm sections 62 and 64 have reduced portions 68 receiving and supporting opposite ends of the spring 63. The function of the spring 63 is to provide flexibility to the actuating arm so that relative movement can take place between the sprung and unsprung portions of the vehicle without necessarily resulting in rotation of the valve actuating shaft 42.

Referring again to FIGURE 3, a downwardly depending arm 71 is provided having an enlarged counterweight portion 72 at its lower extremity. This forms an inertia responsive member similar to that shown in FIGURES 1 and 2, but differing therefrom in that instead of being directly connected to the actuating arm as in FIGURES 1 and 2, it is pivotally supported at 73 upon the housing 41 of the leveling valve, and has a connection with the actuating arm section 62 by means of a pin 74 carried by an offset portion 76 of the counterweight arm 71. The pin 74 is slidably received within a groove 77 provided in the section 62 of the actuating arm. This arrangement provides a separate mounting for the counterweight to relieve the valve actuating shaft 42 of stress, and at the same time provides a mechanical advantage for the operation of the counterweight so that a smaller weight may be used.

*Operation*

Reference is made to FIGURE 1 for a discussion of the operation of applicant's invention during acceleration and deceleration of the vehicle, and on inclined or hilly roads.

It will be noted that the actuating shaft 17 of the front leveling valve 14 extends transversely of the vehicle so that the counterweight 28 is mounted for swinging movement in a direction longitudinally of the vehicle. During vehicle braking there is a tendency for the forward portion of the vehicle chassis to dive. This results in a counterclockwise rotation of the valve actuating arm 16 and the valve actuating shaft 17 which, as discussed above, would result in opening the intake valve to admit air under pressure to the air spring to make a height correction. This correction is undesirable, however, since when the vehicle deceleration is eliminated the forward portion of the vehicle would then be too high. The counterweight 28, however, opposes this correction in that during vehicle deceleration its forward inertia tends to swing the valve actuating arm 16 and shaft 17 in a clockwise direction, thus opposing the forces on the arm and shaft due to the diving of the forward portion of the chassis. As a result, the height correction resulting from vehicle deceleration is greatly reduced and may in some instances be completely eliminated.

During vehicle acceleration, the inertia responsive counterweight 28 likewise functions to oppose an unwanted correction. During acceleration there is a tendency for the forward portion of the vehicle chassis to lift, swinging the actuating arm 16 and the valve actuating shaft 17 in a clockwise direction, which would normally open the exhaust valve. This would exhaust air from the air spring, and cause the vehicle riding height to be too low when the acceleration ceased. This action, however, is resisted and opposed by the counterweight 28 which, due to its inertia, tends to rotate the valve actuating arm 16 and shaft 17 in the opposite or counterclockwise direction.

The counterweight 28 is also effective when the vehicle is either parked on a hill or climbing or descending a hill at constant speed. At this time, the inclination of the vehicle varies the effective weight of the vehicle at the front and rear thereof, and would tend to make a leveling correction due to the variation between the front of the vehicle chassis and the front road wheels. At the same time, however, gravity acts upon the counterweight 28 to oppose this correction.

Although a longitudinally movable inertia responsive member 28 is shown only with a front leveling valve, it could likewise be incorporated with a rear leveling valve if necessary or desirable to oppose leveling corrections at the rear of the vehicle during acceleration and braking. In many types of vehicle, however, the rear suspension is such as to make this unnecessary since the suspension itself may provide adequate anti-lift and anti-squat characteristics.

With reference now to FIGURE 2, it will be noted that the valve actuating shafts 31 for the rear leveling valves 29 extend generally longitudinally of the vehicle so that the counterweights 38 are mounted for swinging movement in transverse directions. During cornering of the vehicle centrifugal force acts upon the counterweights 38 in such manner as to oppose the actuation of the leveling valves which might otherwise result from the tilting of the vehicle during cornering.

During a turn the side of the vehicle on the outer side of the turn tends to be lowered, while the inner side of the vehicle lifts, assuming the turn to be a right turn, the left side of the vehicle chassis is lowered, resulting in a tendency for the left hand valve actuating arm 32 and shaft 31 to rotate in a counterclockwise direction and to open the intake valve. Centrifugal force upon the counterweight 38, however, tends to urge it outwardly and applies a counteracting force in a clockwise direction which opposes the undesired valve actuation. On the opposite or right side of the vehicle, the lifting of the vehicle tends to rotate the valve actuating arm 32 and shaft 31 in a counterclockwise direction to open the exhaust valve. This is opposed, however, by the centrifugal force acting upon the counterweight 38 which tends to rotate the valve actuating arm 32 and shaft 31 in a clockwise direction. As a result, height corrections during cornering of the vehicle are minimized and in some instances eliminated so that the vehicle will retain its normal level attitude when the vehicle returns to a straight portion of the road.

The counterweights 38 of the rear leveling valves are also effective by reason of the static gravity effect thereon to partially counteract the tendency of the leveling valves to effect a miscorrection when the vehicle is parked in a laterally tilted condition.

It will be understood that the invention is not to be limited to the exact construction shown and described, but that various changes and modifications may be made without departing from the spirit and scope of the invention, as defined in the appended claims.

What is claimed is:

1. In a motor vehicle having a chassis resiliently supported upon front and rear road wheels by a plurality of air springs, a front leveling valve adjacent the front of said vehicle, a rear leveling valve adjacent the rear of said vehicle, actuating means for said front and rear leveling valves responsive to relative movement between said chassis and said front and rear road wheels respectively, an inertia responsive member for said front leveling valve mounted for pivotal movement about an axis extending transversely of said vehicle to oppose the operation of said front leveling valve by its actuating means during acceleration and deceleration of said vehicle, and an inertia responsive member for said rear leveling valve mounted for pivotal movement about an axis extending longitudinally of said vehicle to oppose the operation of said rear leveling valve by its actuating means during cornering of said vehicle.

2. In a motor vehicle having a chassis resiliently supported upon two front and two rear road wheels by an air spring adjacent each road wheel, a front leveling valve operatively connected to the two front air springs, a pair of rear leveling valves at opposite sides of the vehicle each operatively connected to one of said rear air springs, actuating means for said front and rear leveling valves responsive to relative movement between said chassis and said front and rear road wheels respectively, a transversely extending valve actuating shaft for said front leveling valve operatively connected to the actuating means for said valve, a weighted member connected to said valve actuating shaft for swinging movement in a fore and aft direction to oppose the actuation of said front leveling valve by its actuating means during acceleration and deceleration of said vehicle, a longitudinally extending valve actuating shaft for each of said rear leveling valves operatively connected to the actuating means for said valves, and a weighted member operatively connected to each of said last named valve actuating shafts for swinging movement in a lateral direction to oppose the actuation of said rear leveling valves by their acuating means during cornering of said vehicle.

3. In a motor vehicle having a sprung member and an unsprung member, an air spring resiliently connecting said members, a leveling valve for said air spring having a body mounted upon one of said members, a valve actuating shaft for said leveling valve, an actuating arm connected to said actuating shaft and operatively connected to the other of said members to be responsive to relative movement between said members, a weighted member pivotally mounted upon said body of said leveling valve and having a part positioned adjacent said actuating arm, and a sliding connection between said part and said arm.

4. In a motor vehicle having a chassis resiliently supported at one end upon two transversely spaced road wheels by an air spring adjacent each road wheel, a leveling valve for each road wheel operatively connected to the air spring for that wheel, actuating means for each of said leveling valves responsive to relative movement between said chassis and the respective road wheel, a longitudinally extending valve actuating shaft for each of said leveling valves operatively connected to the actuating means for said valves, said valve actuating shafts being parallel to each other, and a weighted member operatively connected to each of said valve actuating shafts for pivotal movement about the longitudinal axis of the respective shaft to oppose the actuation of each leveling valve during cornering of the vehicle.

5. In a motor vehicle having a chassis resiliently supported upon front and rear road wheels by a plurality of air springs, said front road wheels being interconnected by a stabilizer bar having a central body portion rotatable about a transversely extending axis, a front leveling valve mounted upon said chassis adjacent the longitudinal centerline of the vehicle, a valve actuating shaft rotatable about a transversely extending axis parallel to the body portion of said stabilizer bar, linkage connecting said valve actuating shaft to said stabilizer bar to be responsive to rotation of said stabilizer bar about its transversely extending axis occurring as a result of relative vertical movement between said front road wheels and said chassis, a weighted member connected to said valve actuating shaft for pivotal movement about the transversely extending axis of said shaft and opposing the actuation of said leveling valve by its actuating shaft during acceleration and deceleration of the vehicle, a pair of rear leveling valves mounted upon said chassis adjacent each rear road wheel, valve actuating shafts for said rear leveling valves rotatable about parallel longitudinally extending axes, actuating means for the actuating shafts of said rear leveling valves responsive to relative vertical movement between said rear road wheels and said chassis, and a weighted member connected to each of the actuating shafts for said rear road wheels for pivotal movement about the parallel longitudinally extending axes of said last named shafts and opposing the actuation of said rear leveling valves during cornering of the vehicle.

6. In a motor vehicle having a chassis resiliently supported upon front and rear road wheels by a plurality of air springs, a front leveling valve adjacent the front of said vehicle, a rear leveling valve adjacent the rear of said vehicle, actuating means for said front and rear leveling valves responsive to relative movement between said chassis and said front and rear road wheels respectively, an inertia responsive member for one of said leveling valves mounted for pivotal movement about an axis extending generally transversely of said vehicle to oppose the operation of said one leveling valve by its actuating means during acceleration and deceleration of said vehicle, and an inertia responsive member for the other of said leveling valves mounted for pivotal movement about an axis extending generally longitudinally of said vehicle to oppose the operation of said other leveling valve by its actuating means during cornering of said vehicle.

References Cited in the file of this patent
UNITED STATES PATENTS

| | | |
|---|---|---|
| 2,490,311 | Rostu | Dec. 6, 1949 |
| 2,778,656 | May | Jan. 22, 1957 |
| 2,844,384 | Jackson | July 22, 1958 |
| 2,849,225 | Lucien | Aug. 26, 1958 |